United States Patent [19]
Yasuhara et al.

[11] Patent Number: 5,796,388
[45] Date of Patent: Aug. 18, 1998

[54] GRAPHIC IMAGE PROCESSING APPARATUS

[75] Inventors: Nae Yasuhara, Tokyo; Miyuki Marusawa, Kanagawa; Hiroshi Yasuhara, Tokyo; Hiroko Kusano, Kanagawa, all of Japan

[73] Assignee: Sony Corporation, Tokyo, Japan

[21] Appl. No.: 31,036

[22] Filed: Mar. 11, 1993

Related U.S. Application Data

[63] Continuation of Ser. No. 731,449, Jul. 17, 1991, abandoned.

[30] Foreign Application Priority Data

Aug. 31, 1990 [JP] Japan ................. 2-231883
Sep. 12, 1990 [JP] Japan ................. 2-242030

[51] Int. Cl.$^6$ ................................ G09G 5/00
[52] U.S. Cl. ............. 345/168; 345/156; 345/473
[58] Field of Search ................. 340/706, 709, 340/712; 178/18–19; 434/84–85, 169, 170, 258, 339; 345/156, 157, 160, 161, 168, 169, 172, 173, 473

[56] References Cited

U.S. PATENT DOCUMENTS

| | | | |
|---|---|---|---|
| 4,045,789 | 8/1977 | Bristow | 340/725 |
| 4,709,230 | 11/1987 | Popowshi et al. | 340/703 |
| 4,725,694 | 2/1988 | Auer et al. | 340/712 |
| 4,882,582 | 11/1989 | Oka | 340/712 |
| 4,928,093 | 5/1990 | Rahman | 340/710 |
| 4,952,051 | 8/1990 | Lovell et al. | 340/725 |
| 5,088,928 | 2/1992 | Chan | 434/339 |

OTHER PUBLICATIONS

"Using MacWrite and MacPaint" Tim Field, 1984, pp. 4, 67–79.

Primary Examiner—Dennis-Doon Chow
Attorney, Agent, or Firm—Limbach & Limbach L.L.P.

[57] ABSTRACT

A graphic image processing apparatus comprises a character pattern selecting device for selecting a predetermined character pattern, a color selecting device for selecting predetermined color data corresponding to the character pattern, a display device for displaying the character pattern, an operating device for moving a cursor on the display device, a first memory for storing data corresponding to the character pattern and color information and reading it out, a second memory for storing display data which are displayed on the display device, a control device for changing the cursor to the character pattern by operating the character pattern selecting device, and an executing device for fixing the character pattern in the second memory so as to display a desired position which is decided by the user by operating the operating device.

6 Claims, 17 Drawing Sheets

FIG. 5

| Memory Area | Shape Number | X | Y | Color | Scroll Code | Animation Cell Number As |
|---|---|---|---|---|---|---|
| 1 | 1 | 100 | 100 | 2 | 3 | 0 |
| ⋮ | ⋮ | ⋮ | ⋮ | ⋮ | ⋮ | ⋮ |
| 100 | 1 | 100 | 80 | 1 | 3 | 0 | ns
GRAPHIC IMAGE PROCESSING APPARATUS

This is a continuation of application Ser. No. 07/731,449 filed on Jul. 17, 1991, abandoned.

BACKGROUND OF THE INVENTION

1. Field of the Invention

This invention relates to graphic image processing apparatus suitable for making a picture on the screen of a television receiver.

2. Description of the Prior Art

Graphic image processing apparatus has been proposed for making a picture on a display screen of, for example, a television receiver or monitor. This kind of graphic image processing apparatus includes a casing having a tablet and a key pad. In use, when the user selects a desired character pattern from several character patterns (all the characters are the same size, for example, 16 dots×16 dots) displayed on the display screen of a monitor by a character pattern selecting key or the like, then the selected character pattern of the monitor is replaced by a cursor on the display screen of the monitor. When there is no desired character pattern among the several character patterns on the display screen of the monitor, then the user can select a desired character pattern from several other character patterns newly displayed on the display screen by the character pattern selecting key or the like. Moreover, the user can select the color of the selected character pattern by a color selecting key or the like, whereby the color of the selected character pattern can be changed on the display screen of the monitor.

Then, the user moves the cursor to a desired position on the display screen of the monitor, by deciding the desired position of the cursor on the display screen of the monitor using a tablet pen on a tablet corresponding to the display screen of the monitor. Then, when the user pushes a position deciding key, the character pattern which has been replaced by the cursor can be placed at that desired position.

As described above, several groups of character patterns are sequentially displayed on the display screen of the monitor, the desired character pattern is selected from the groups of character patterns displayed, and the selected character pattern is replaced by the cursor. Then, after the position of the cursor has been designated on the tablet by the tablet pen, the character pattern replaced by the cursor is placed at the designated position, so a picture can be built up on the display screen of the monitor.

In the above graphic image processing apparatus, since the user selects the desired character pattern from several character patterns displayed on the screen of the monitor by using the selecting key or the like, or the user selects the desired character pattern from several other character patterns additionally displayed on the screen of the monitor by the selecting key or the like, the user cannot look through all the character patterns available before selecting the desired character pattern. Thus, it is quite troublesome for the user to select a desired character pattern.

Also, since the color of the selected character pattern is selected by a color selecting key or the like and decided after the user confirms the selected color on the display screen of the monitor, the user cannot look through all the colors available, before selecting the desired color of the character pattern. Also, therefore, it is quite troublesome for the user to select the color of the character pattern. Furthermore, the selecting process of the character pattern and the selecting process of the color of the selected character pattern is complicated, which results in a complicated process for making a picture.

In addition, with the above graphic image processing apparatus, since only a still image can be made on the display screen of the monitor, the viewer cannot enjoy full visual effects.

SUMMARY OF THE INVENTION

Accordingly, it is an object of the present invention to provide an improved graphic image processing apparatus in which the aforenoted shortcomings and disadvantages encountered with the prior art can be eliminated.

More specifically, it is an object of the present invention to provide a graphic image processing apparatus in which a desired character pattern and a color of the selected character pattern can be selected easily and comprehensively, so that a picture can be made on a screen of a display apparatus satisfactorily.

It is another object of the present invention to provide a graphic image processing apparatus in which a graphic image on a screen can be changed like an animated motion, thus enabling the user to make a vivid picture on a display screen.

It is a further object of the present invention to provide a graphic image processing apparatus by which the viewer can enjoy a picture from a visual standpoint.

According to a first aspect of the present invention, a graphic image processing apparatus comprises a character pattern selecting device for selecting a predetermined character pattern, a color selecting device for selecting predetermined color data corresponding to the character pattern, a display device for displaying the character pattern, an operating device for moving a cursor on the display device, a first memory for storing data corresponding to the character pattern and color information and reading them out, a second memory for storing display data which are displayed on the display device, a control device for changing the cursor to the character pattern by operating the character pattern selecting device, and an executing device for fixing the character pattern in the second memory so as to display a desired position which is decided by the user by operating the operating device.

As a second aspect of the present invention, a graphic image processing apparatus comprises character pattern selecting keys for selecting predetermined color data corresponding to the character patterns, each key being formed on the same sheet switch plate, in which when the sheet switch plate is operated, analog data corresponding to the character pattern are generated, an operating device for moving a cursor on a connected displaying apparatus which is separated from the graphic image processing apparatus, an analog-to-digital converter for converting the analog data to digital data, a read only memory for storing digital data corresponding to the character pattern and the color data and reading them out, a video processor for converting the digital data to video data so as to display the character pattern on the displaying apparatus, a random access memory for storing the video data, a control device for replacing the cursor with the character pattern read out from the read only memory on a screen of the displaying apparatus by operating the character pattern selecting keys, an executing device for fixing the character pattern on the random access memory so as to display a desired position which is decided by the user by operating the operating device, and a casing including at least the character pattern selecting keys, the color selecting keys and the operating device.

In accordance with a third aspect of the present invention, a graphic image processing apparatus for making a picture on a display screen comprises a memory for storing a basic character and various characters corresponding to the basic character, a memory control device for sequentially reading out the basic and various characters from the memory so that the characters change on the screen like an animated motion, and a starting key for starting the animation.

In accordance with a fourth aspect of the present invention, a graphic image processing apparatus comprises a character pattern selecting device for selecting a predetermined basic character pattern, a display device for displaying the character pattern, an operating device for moving a cursor on the display device, a first memory for storing data corresponding to a basic character and various characters corresponding to the basic character, a second memory for storing display data which are displayed on the display device, a control device for changing the cursor to the character pattern by operating the character pattern selecting device, an executing device for fixing the character pattern on the second memory so as to display a desired position which is decided by the user by operating the operating device, a memory control device for sequentially reading out the basic and various characters from the first memory so that the characters change on a screen like an animated motion, and a starting key for starting the animation.

The above and other objects, features, and advantages of the present invention will become apparent from the following detailed description of illustrative embodiments thereof to be read in conjunction with the accompanying drawings, in which like reference numerals are used to identify the same or similar parts in the several views.

BRIEF DESCRIPTION OF THE DRAWINGS

FIG. 5 is a table for explaining the graphic image processing apparatus;

DETAILED DESCRIPTION OF THE PREFERRED EMBODIMENTS

Figure 1:
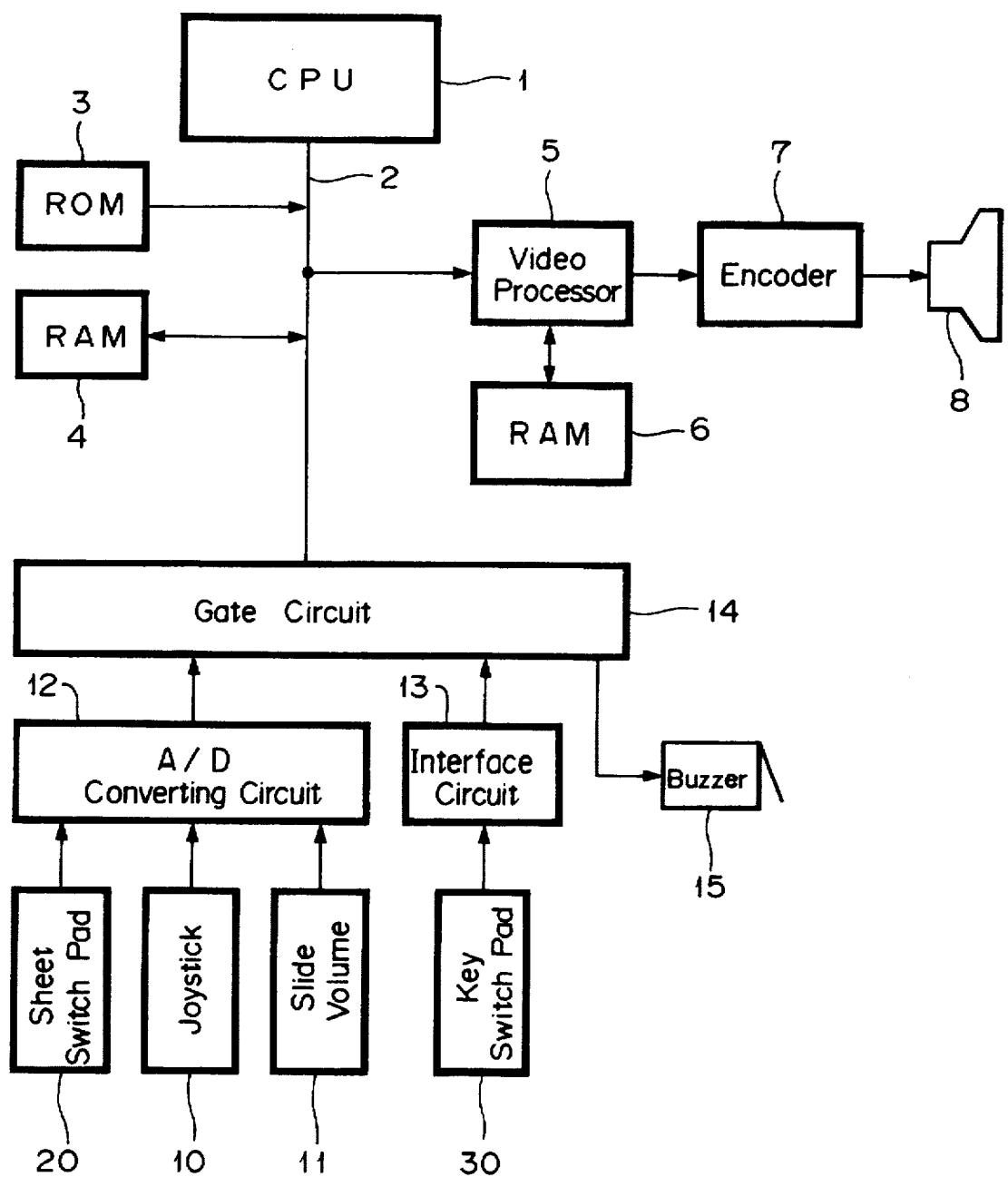
FIG. 1 is a block diagram of an embodiment of graphic image processing apparatus according to the present invention.

A graphic image processing apparatus according to the present invention will hereinafter be described in detail with reference first to FIG. 1.

A central processing unit (CPU) 1 is connected through a bus (formed of an address bus, control bus, data bus or the like) 2 to a read-only memory (ROM) 3 in which data such as programs, character patterns and so on are stored, and a RAM (random access memory) 4 in which data or the like can be stored. A video processor 5 sequentially reads image data which are stored in a RAM 6 through the bus 2 and the video processor 5, and converts them into R (red), G (green) and B (blue) signals. These R, G and B signals are supplied to an encoder (for example, an NTSC encoder) 7. The encoder 7 converts the R, G and B signals from the video processor 5 into an NTSC color video signal, and this NTSC color video signal is supplied to a monitor 8, thereby being displayed on the picture screen of the monitor 8 as image data.

A sheet switch pad 20 comprises keys for designating character patterns displayed on the picture screen of the monitor and keys for specifying colors of character patterns selected by the character pattern designating keys, as will be described more fully later. If any of the keys on the sheet switch pad 20 is pushed, an analog information signal generated by the depression of the key on the sheet switch pad 20 is converted into a digital information signal by an analog-to-digital (A/D) converting circuit 21, and the digital information signal is supplied through a gate circuit 14 and the bus 2 to the CPU 1. A joystick 10 generates an analog positional information signal from a potentiometer (not shown) provided at a right angle thereto. An analog positional information signal from the joystick 10 is converted into a digital information signal by the A/D converting circuit 12 and fed through the gate circuit 14 and the bus 2 to the CPU 1. A slide volume 11 generates an analog background color information signal which changes the color of a background of a picture when it is slidably moved. The analog background color information from the slide volume 11 is converted into a digital background color information signal by the A/D converting circuit 12, and fed through the gate circuit 14 and the bus 2 to the CPU 1. A key switch pad 30 comprises a clear key 31, an undo key 32, an executing key 33, forward and backward designating keys 34r and 34f, an erase key 35, a GO/STOP key 36 and a scroll key unit 37 (see FIG. 2). A command information signal output by the depression of any of the keys on the key switch pad 30 is supplied through an interface circuit 13, the gate circuit 14 and the bus 2 to the CPU 1. A buzzer 15 emits a sound associated with switch depression information or various command information supplied thereto from the CPU 1 through the gate circuit 14. The buzzer 15 is also arranged to emit an alarm sound every ten minutes until the next operation is carried out if no operation is carried out at all after the graphic image processing apparatus has been energized, so preventing power from being consumed uselessly.

Figure 2:
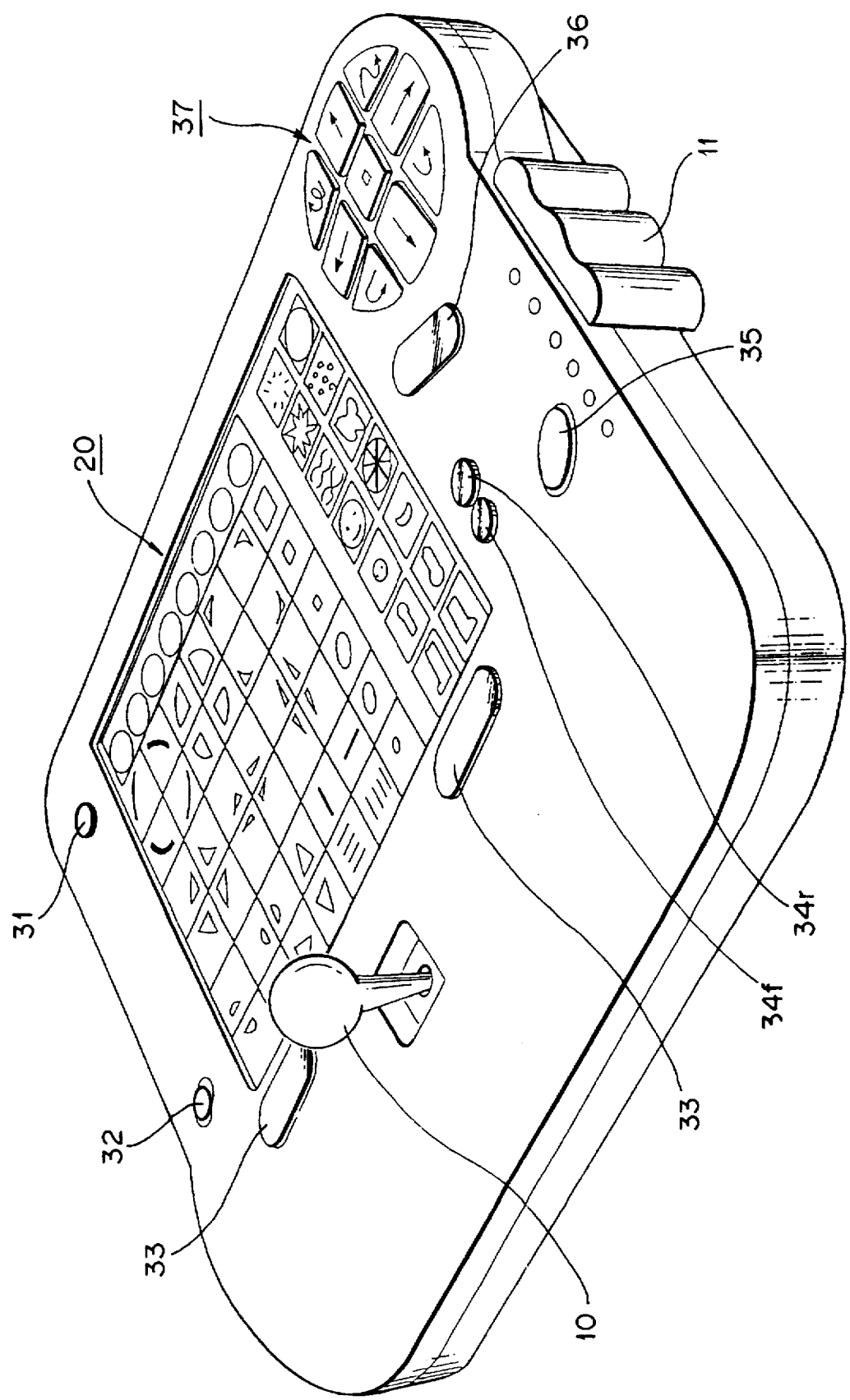
FIG. 2 is a perspective view illustrating the appearance of the graphic image processing apparatus.
Figure 3:
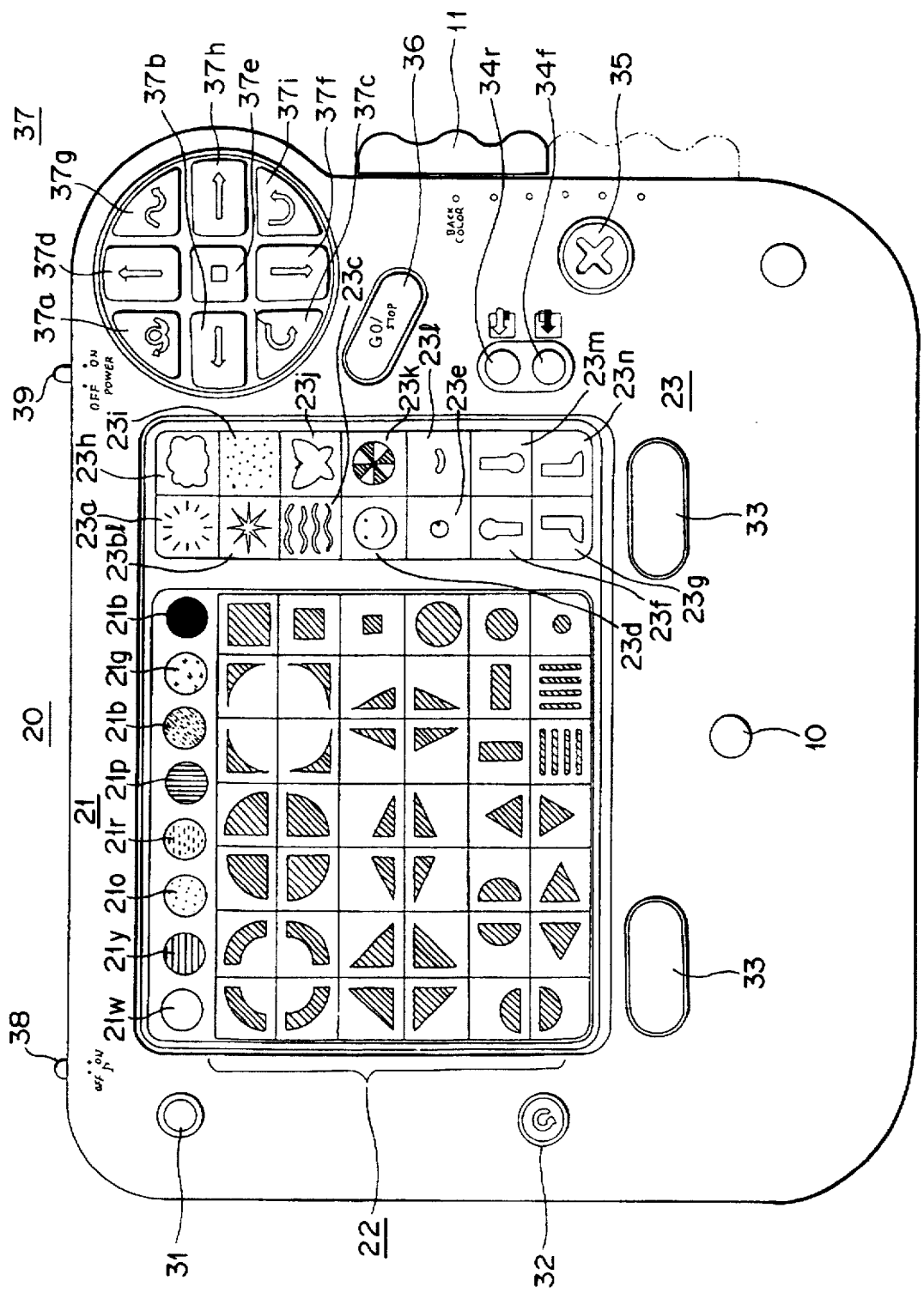
FIG. 3 is a plan view illustrating an example of an operating panel of the graphic image processing apparatus.

FIGS. 2 and 3 show the appearance of the embodiment of graphic image processing apparatus. The sheet switch pad 20 of FIG. 2 comprises an abstract shape key unit 22, a color designating key unit 21 and a specific shape key unit 23. The color designating key unit 21 is used to designate the color of the shape formed on the picture screen by the abstract shape key unit 22 and the specific shape key unit 23, both of which will be described more fully later. The color designating key unit 21 comprises a white key 21w, a yellow key 21y, an orange key 21o, a red key 21r, a purple key 21p, a blue key 21b, a green key 21g and a black key 21bl, and the depression portions of the keys 21w, 21y, 21o, 21r, 21p, 21b, 21g and 21bl are colored by colors of initial letters of the first digits thereof, respectively, so that the user can immediately understand the keys of colors to be used when he sees the keys.

As shown in FIG. 3, the abstract shape key unit 22 comprises 42 keys. When the user pushes any of these keys, the abstract shape shown on the pushed key can be displayed on the picture screen of the monitor 8. The specific shape key unit 23 comprises fourteen keys 23a, 23b, ..., 23n on which specific shapes are displayed, and specific shapes drawn on the keys 23a, 23b, ..., 23n are displayed on the picture screen by the depression thereof. The clear key 31 is used to clear the shape pattern displayed on the picture screen, and the undo key 32 is used to change the present state back to the previous state before a certain command was issued. The executing key 33 is used to determine the position of the shape selected by the specific shape key unit 23, and the forward and backward designating keys 34r and 34f are used to designate the front and back of the character pattern. The erase key 35 is used to erase the character pattern, and the GO/STOP key 36 is used to enable or disable the character pattern to move. The scroll key unit 37 is used to scroll the displayed shape pattern. As shown in FIG. 3, the scroll key unit 37 comprises eight keys 37a, 37b, ..., 37i representing scroll conditions, respectively and the shape selected by the abstract shape key unit 22 or the specific shape key unit 23 is scrolled on the picture screen of the monitor 8 in accordance with the motion indicated by each of the scroll keys 37a, 37b, ..., 37i. FIG. 3 shows a buzzer switch 38 which determines whether or not the buzzer 15 (see FIG. 1) is energized, and a power switch 39.

Figure 4A:
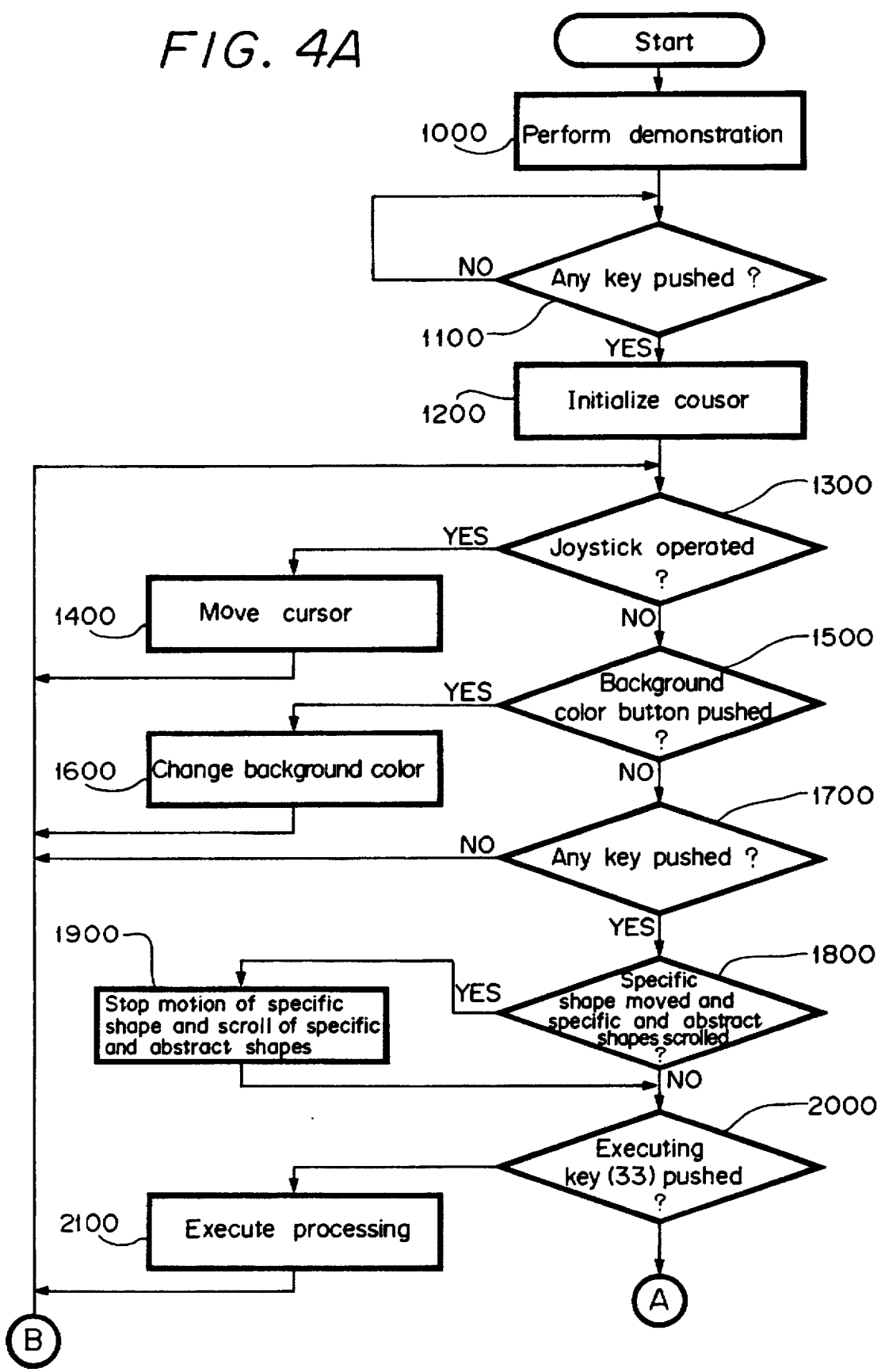
FIG. 4 (formed of FIGS. 4A and 4B) is a flowchart to which references will be made in explaining the operation of the graphic image processing apparatus.
Figure 4B:
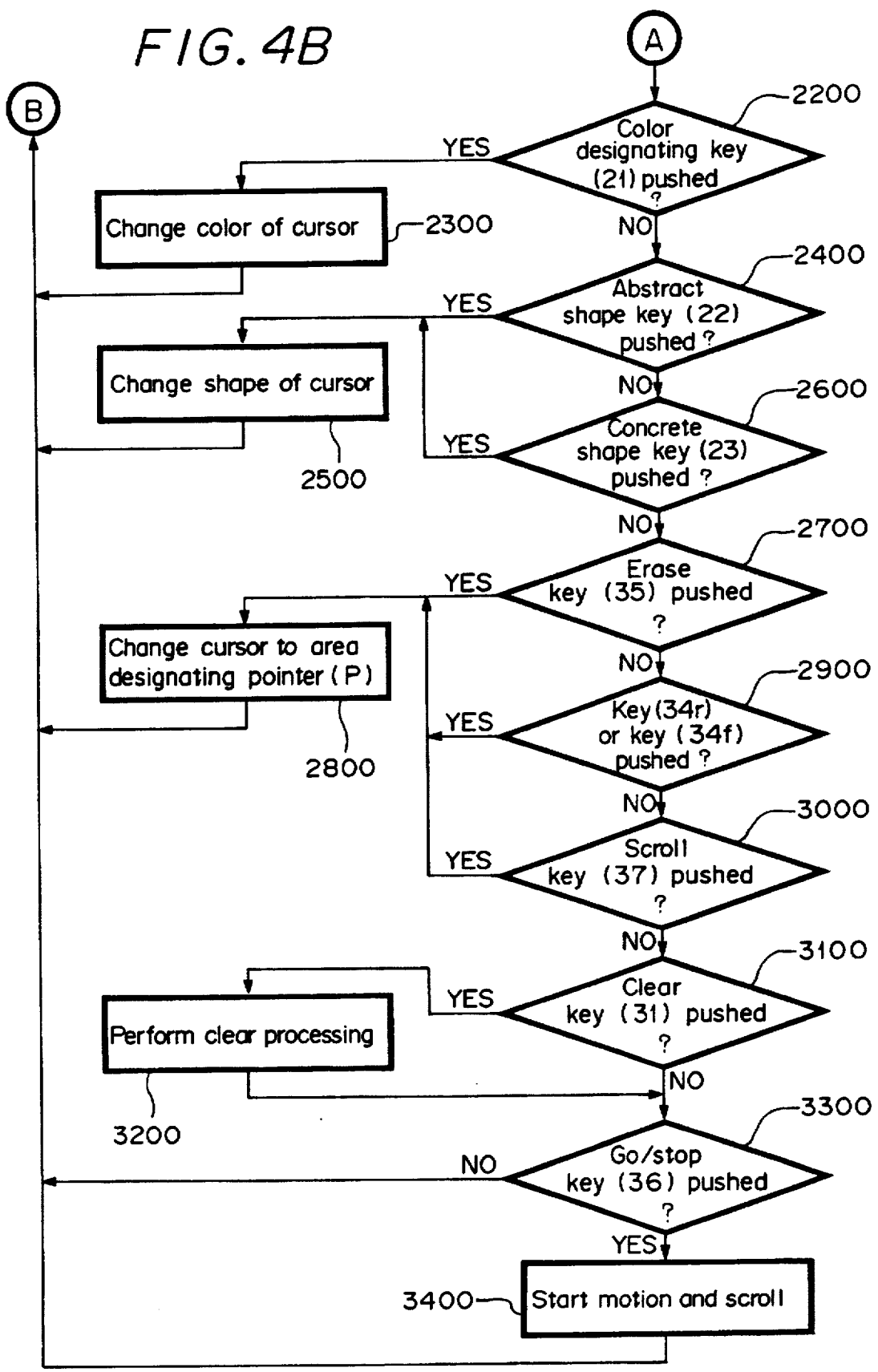

Operation of the embodiment of graphic image processing apparatus according to the present invention will be described next with reference to the flowchart of FIG. 4, formed of FIGS. 4A and 4B drawn on two sheets so as to permit the use of a suitably large scale.

Referring to FIG. 4, following the Start of operation, the power switch 39 is turned on and the processing proceeds to step 1000, whereat a demonstration occurs. In the demonstration, a picture formed of an abstract shape or a specific shape is scrolled or moved on the picture screen of the monitor 8 in accordance with a demonstration pattern program stored beforehand in the ROM 3. Then, the processing proceeds to the next decision step 1100.

Figure 6A:
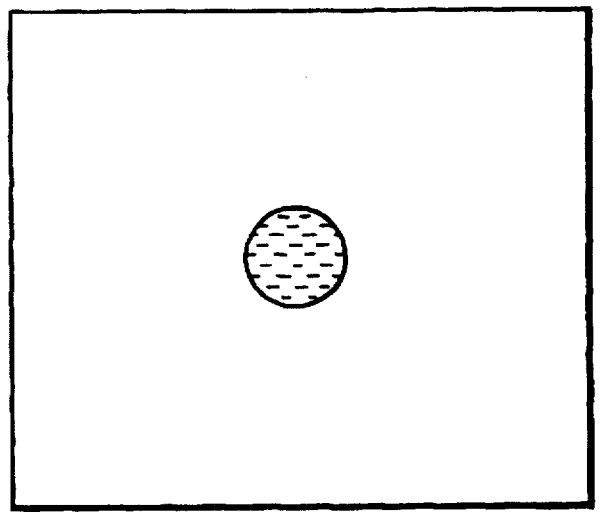
FIGS. 6A to 6I are schematic diagrams used to explain how to operate the graphic image processing apparatus.

It is determined in decision step 1100 whether or not an arbitrary key (see FIG. 2 or 3) has been pushed. If any key has been pushed as represented by a YES at decision step 1100, then the processing proceeds to step 1200, and if a NO is output at step 1100, then the processing returns to the step 1100 and the step 1100 is repeated. In step 1200, the cursor is initialized. In order to initialize the cursor, a shape number indicative of a predetermined abstract shape (for example, a circle), positions X and Y (coordinates of the ordinate and abscissa on the picture screen of the monitor 8) and color data are stored in the memory area of, for example, the RAM 4 in accordance with the program stored beforehand in the ROM 3 as shown in FIG. 5, and on the basis of data stored in the memory area of the RAM 4, a predetermined shape of predetermined color data is stored in the RAM 6 at its predetermined position corresponding to the picture screen of the monitor 8 through the bus 2. Then, the video processor 5 reads out data from the RAM 6, and the thus read image data are supplied through the encoder 7 to the monitor 8 so that an abstract shape of red-circle configuration is displayed by the cursor on the picture screen of the monitor 8 as shown in FIG. 6A. Then, the processing proceeds to the next decision step 1300.

It is determined in decision step 1300 whether or not the joystick 10 (see FIG. 3) is being operated. If the joystick 10 is being operated as represented by a YES at step 1300, then the processing proceeds to step 1400, whereas if a NO is output at step 1300, then the processing proceeds to the next decision step 1500.

In step 1400, data of positions X and Y (see FIG. 5) of the memory area of the RAM 4 are changed in response to the digital positional information signal supplied to the CPU 1 from the joystick 10 through the A/D converting circuit 12, the gate circuit 14 and the bus 2, if necessary. Further, on the basis of these data, the shape corresponding to the shape number and stored in the ROM 3 is stored in the RAM 6 at its position (address) corresponding to the positions X and Y by color data corresponding to the color number if necessary. In that event, in the case of the abstract shape, the shape corresponding to the shape number and stored in the ROM 3 is stored in the RAM 6 at its positions (addresses) corresponding the positions X and Y in the form of color data corresponding to the color number, whereas in the case of a specific shape, the shape corresponding to an animation cell number, which will be described later, is stored in the RAM 6 at its positions (addresses) corresponding to the positions X and Y in the form of predetermined color data.

Figure 6B:
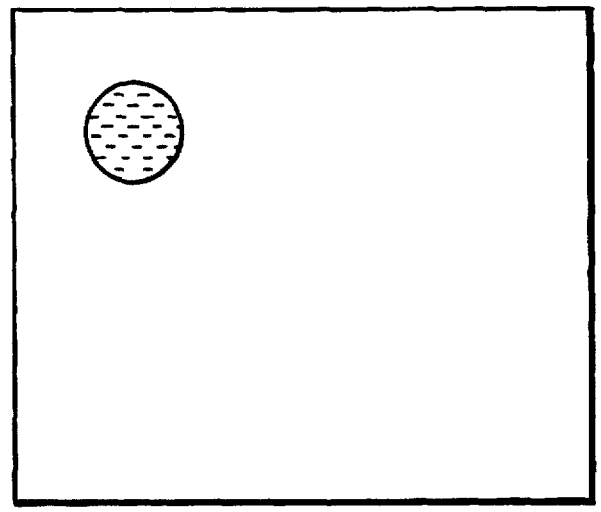

Then, the video processor 5 reads the image data stored in the RAM 6 and the thus read image data are supplied through the encoder 7 to the monitor 8, so that the abstract shape formed of the cursor is displayed on the picture screen of the monitor 8 at its predetermined position as shown in FIG. 6B. Then, the processing returns to decision step 1300 and the decision step 1300 is repeated.

It is determined in decision step 1500 whether or not the background color button (slide volume) 11 is being operated. If the background color button 11 is being operated as represented by a YES at step 1500, then the processing proceeds to step 1600. If on the other hand a NO is output at step 1500, then the processing proceeds to the next decision step 1700. In step 1600, the portion other than the shape (that is, the background) is colored in the designated color on the picture screen of the monitor 8. That is, color data of the designated background color are stored in the RAM 6 at its address area corresponding to the background. In other words, the video processor 5 reads out data from the RAM 6 at its address area corresponding to the background and converts the thus read-out data into R, G and B signals on the basis of data such as the look-up table and information from the slide volume 11, thereby to change the background color. Then, the processing returns to decision step 1300.

It is determined in decision step 1700 whether or not any key is being pushed. If a certain key is being pushed as represented by a YES at step 1700, then the processing proceeds to the next decision step 1800. If a NO is output at decision step 1700, then the decision step 1300 is repeated. The depression of an arbitrary key disables both the motion (animation motion) of the specific shape and the scroll of the abstract and specific shapes on the picture screen of the monitor 8.

It is determined in decision step 1800 whether or not the specific shape is moved like an animation motion and whether or not the specific and abstract shapes are scrolled. If a YES is output at step 1800, then the processing proceeds to step 1900, whereas if a NO is output at step 1800, then the processing proceeds to the next decision step 2000.

In step 1900, the motion (animation motion) of the specific shape and the scroll of the specific and abstract shapes are stopped, and then the processing proceeds to the next decision step 2000.

It is determined in decision step 2000 whether or not the executing key 33 is being pushed. If a YES is output at decision step 2000, then the processing proceeds to step 2100, whereas if a NO is output, then the processing proceeds to the next decision step 2200.

In step 2100, the processing is executed. In this processing, if the cursor represents a shape, then the shape formed of the cursor is determined at the cursor position. That is, as shown in FIG. 5, data of the positions X and Y stored in the RAM 4 are determined, thereby one memory area being determined. Then, the processing returns to decision step 1300 and the decision step 1300 is repeated.

It is determined in decision step 2200 whether or not the color designating key 21 is being pushed. If a YES is output at decision step 2200, then the processing proceeds to step 2300, whereas if a NO is output, then the processing proceeds to the next decision step 2400.

Figure 6C:
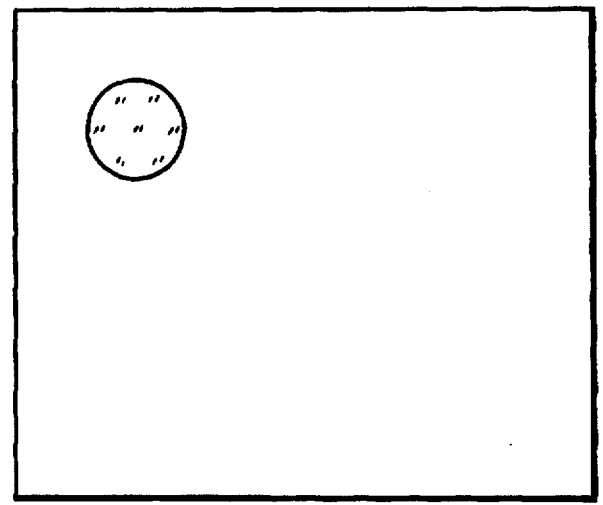

In step 2300, the color of the cursor is changed. More specifically, as shown in FIG. 5, the color data of color stored in the memory area of the RAM 4 are changed to color data corresponding to the color designated by the color designating key unit 21, whereby the shape stored in the above memory area is stored in the RAM 6 by the color data stored in the RAM 4. Then, the video processor 5 reads image data stored in the RAM 6, and the thus read image data are supplied through the encoder 7 to the monitor 8 so that the shape formed of the cursor is displayed on the picture screen of the monitor 8 in the color designated by the color designating key unit 21. In that event, while the specific shape is changed in position as the cursor, the color of the specific chape cannot be changed by the color designating key unit 21. As, for example, shown in FIG. 6C, if the color designating key 21g is pushed, then the color of the abstract shape is changed to green, and then the processing returns to decision step 1300.

It is determined in decision step 2400 whether or not the abstract shape key 22 is being pushed. If a YES is output at decision step 2400, then the processing proceeds to step 2500, whereas if a NO is output, then the processing proceeds to the next decision step 2600.

Figure 6D:
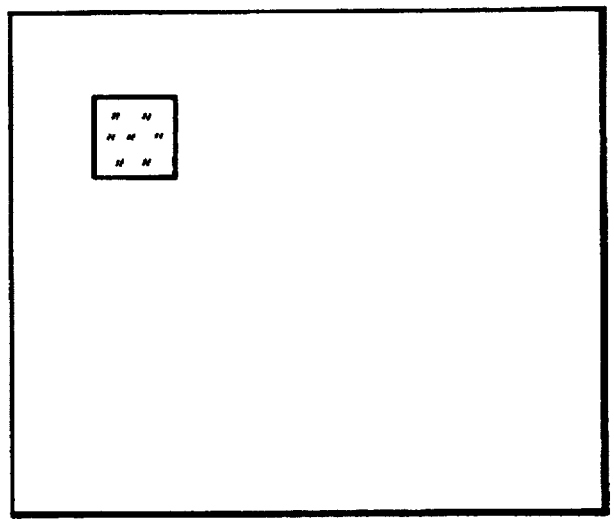

In step 2500, the shape of the cursor is changed. That is, as shown in FIG. 5, shape number data of the shape number stored in the memory area of the RAM 4 are changed to shape number data corresponding to the shape designated by the abstract shape key unit 22. Thus, shape data corresponding to the shape number data stored in the above RAM 4 are read out from the ROM 3 and the resultant shape data are stored in the RAM 6 on the basis of respective data of the above memory area. Then, the video processor 5 reads image data stored in the RAM 6 and the thus read image data are supplied through the encoder 7 to the monitor 8 so that the shape formed of the cursor is displayed on the picture screen of the monitor 8 in the form of the shape designated by the abstract shape key 22. As, for example, shown in FIG. 6D, if the square mark key of the abstract shape key 22 is pushed, then the cursor of circle configuration is changed to the cursor of square configuration, and then the processing returns to decision step 1300 again.

It is determined in decision step 2600 whether or not the specific shape key unit 23 is being pushed. If a YES is output at decision step 2600, then the processing proceeds to step 2500, whereas if a NO is output, then the processing proceeds to the next decision step 2700.

Figure 6E:
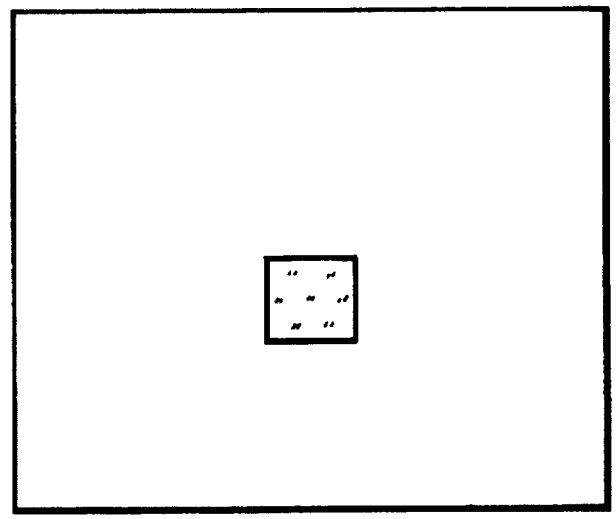
Figure 6F:
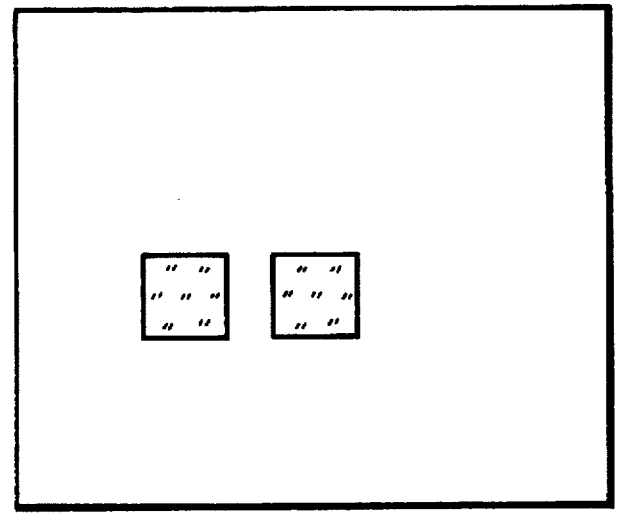

In step 2500, the shape of the cursor is changed. More specifically, as shown in FIG. 5, shape number data of shape number stored in the memory area of the RAM 4 are changed to shape number data corresponding to the shape designated by the specific shape key unit 23, whereby shape data corresponding to the shape number data stored in the RAM 4 are read out from the ROM 3. The thus read shape data are stored in the RAM 6 on the basis of each data stored in the above memory area. The video processor 5 reads the image data stored in the RAM 6 and the thus read image data are supplied through the encoder 7 to the monitor 8 so that the shape formed of the cursor is displayed on the picture screen of the monitor 8 in the form of the shape designated by the specific shape key 23. Then, the processing returns to decision step 1300, whereat the abstract shape is moved to the position shown in FIG. 6E by the joystick 10. If the executing key 33 is pushed at step 2000, then the position, color and shape of the shape are determined as shown in FIG. 6F and the cursor of the same shape remains.

It is determined in decision step 2700 whether or not the erase key 35 is being pushed. If a YES is output at decision step 2700, then the processing proceeds to step 2800, whereas if a NO is output, then the processing proceeds to the next decision step 2900. If the erase key 35 is being pushed, then the shape on the picture screen of the monitor 8 is erased by a hand-shaped area designating pointer P which will be described later and also all information of this shape are erased from the memory area of the RAM 4 shown in FIG. 5.

Figure 6G:
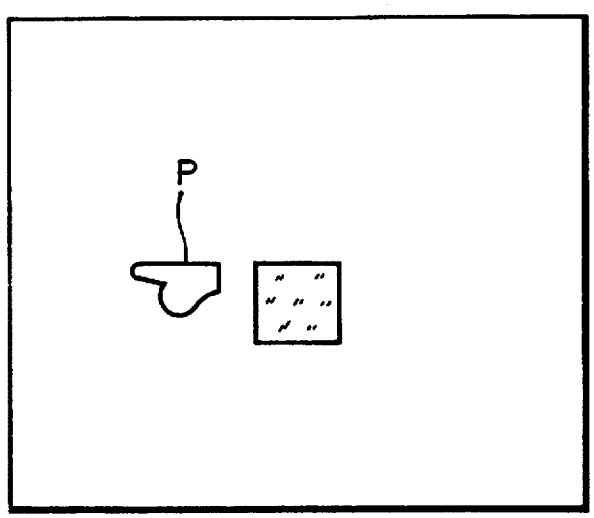

In step 2800, the shape of the cursor is changed to the hand-shaped area designating pointer P shown in FIG. 6G, and then the processing returns to decision step 1300 again.

It is determined at decision step 2900 whether or not the forward or backward key 34r or 34f is being pushed. If a YES is output at decision step 2900, then the processing proceeds to step 2800, whereat the shape of the cursor is changed to the hand-shaped area designating pointer P. If on the other hand a NO is output, then the processing proceeds to the next decision step 3000.

It is determined in decision step 3000 whether or not the scroll key unit 37 is being pushed. If a YES is output at decision step 3000, then the processing proceeds to step 2800, wherein the shape of the cursor is changed to the hand-shaped area designating pointer P. If a NO is output, then the processing proceeds to the next decision step 3100.

It is determined in decision step 3100 whether or not the clear key 31 is being pushed. If a YES is output at decision step 3100, then the processing proceeds to step 3200, whereat the clear processing is executed. If a NO is output, then the processing proceeds to the next decision step 3300.

It is determined in decision step 3300 whether or not the GO/STOP key 36 is being pushed. If a YES is output at decision step 3300, then the processing proceeds to step 3400, whereas if a NO is output, then the processing returns to decision step 1300 again.

Figure 6H:
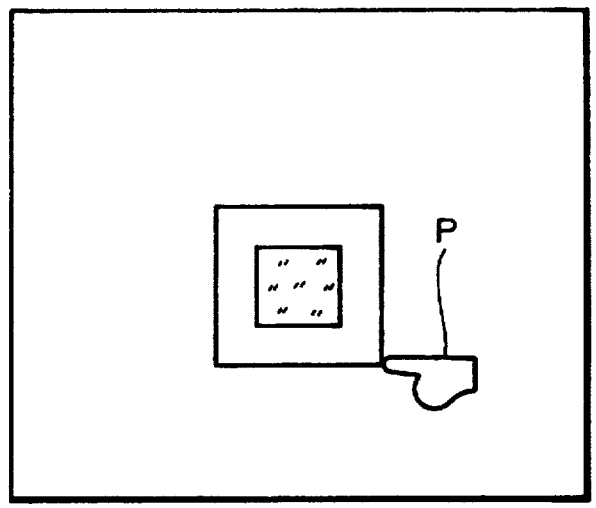
Figure 6I:
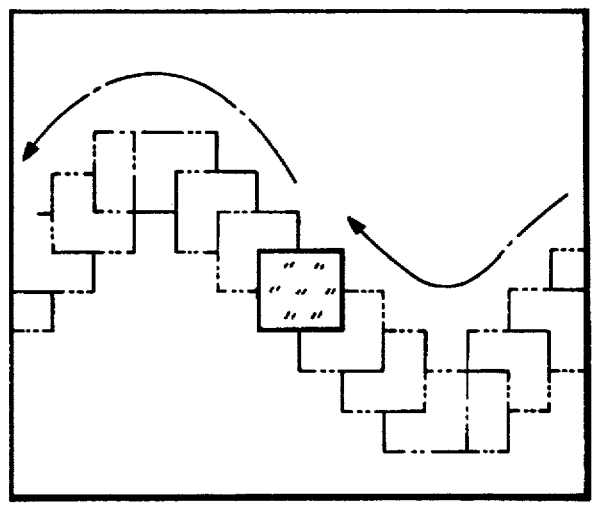

In step 3400, the motion, that is, the scroll of the abstract or specific shape and the motion (animation motion) of the specific shape are started. If, for example, the abstract shape or specific shape is scrolled, then as shown by arrows displayed on the surfaces of the respective keys such as the scroll keys 37a, 37b, . . . , 37i constituting the scroll key pad 37, the position of the shape is determined and then the abstract shape or specific shape designated by the area (shown in FIG. 6H) designating pointer P is scrolled on the picture screen of the monitor 8. In this scrolling, as shown in FIG. 5, the scroll code of the scroll codes stored in the memory area of the RAM 4 is changed in association with the pushed scroll key of the scroll key unit 37. Thus, data of the position X and Y are sequentially changed with a predetermined ratio, written in the RAM 6 as image data in accordance with the changed data stored in the memory area of the RAM 4 and sequentially read by the video processor 5. The thus read image data are supplied through the encoder 7 to the monitor 8, so the shape is scrolled as shown in FIG. 6I. In that event, when the abstract or specific shape is erased or scrolled by the above-mentioned area designating pointer P, one point (formed of one dot) of the overlapping portion of more than two shapes or portion (formed of more than two dots) may be designated on the display screen of the monitor 8. If one point is designated, then the uppermost shape in the overlapping shapes is designated, whereas if the portion is designated, then the overlapping shapes are all designated.

Incidentally, if the GO/STOP key 36 or other arbitrary key is pushed one more time after the scroll or motion (animation motion) of the specific shape is started, then the scroll or motion of the specific shape is stopped.

As is clear from the above explanation, when a picture is created on the picture screen of the monitor 8, the abstract shape key unit 22 and specific shape key unit 23 which select a desired shape movable as the cursor until the shape is determined are arranged as the key which enables the user visually to confirm the shape of the shape. Further, the color designating key unit 21 which designates the color of the shape selected by the above key unit 22 or 23 is arranged as the key which enables the user visually to confirm the kind of colors. Therefore, the shape can be selected and the color of the shape can be selected immediately, thereby simplifying the process for creating the picture. Further, since the sheet switches on which the shape patterns and the colors are displayed are provided on one operating panel of this graphic image processing apparatus as shown in FIG. 3, without displaying the shape on the picture screen of the monitor 8, the user can examine sufficiently the user's own idea for a picture such as shape, kind of shape and color of shape and so on with reference to colors and shapes displayed on respective switches of the sheet switch pad 20. Also, as the analog joystick 10 is utilized in the above embodiment, the response speed can be increased and the figure can be placed at the predetermined position on the picture screen of the monitor 8 with increased accuracy.

In the above embodiment, the shape and the color can be selected in that order or vice versa. Further, while the picture is displayed on the picture screen of the monitor 8, the picture may be displayed on the display screen of a liquid crystal display (LCD) device.

As described above, since the shape of the cursor on the picture screen of the display apparatus is changed to the desired character pattern by the character selecting button, the color of the selected character pattern is changed to the desired color by the color designating button and this cursor is moved to the predetermined position on the picture screen by the cursor moving means thereby to determine the character pattern at the desired position on the picture screen, the desired character and the color of the selected character can be selected very easily and comprehensively, which makes it possible for the user to draw a picture on the picture screen satisfactorily.

The animation operation of a specific shape will be described more fully below.

When the specific shape keys 23a, 23b, . . . , 23n are selectively pushed, then specific shapes (these specific shapes will hereinafter be referred to as basic specific shapes) displayed on the surfaces of these specific shape keys 23a, 23b, . . . , 23n are displayed on the picture screen of the monitor 8 as the cursors.

Figure 7A:
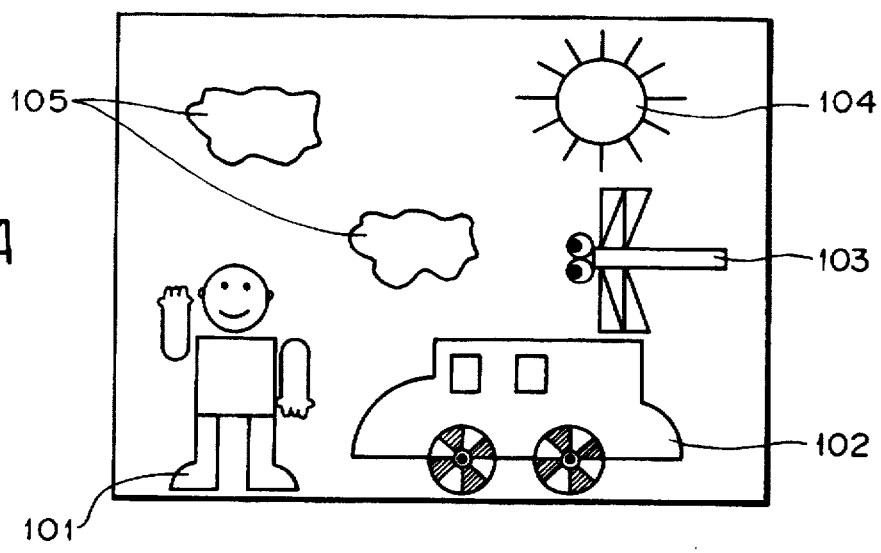
FIGS. 7A to 7C are pictorial representations used to explain examples of animated motion of pictures made by the graphic image processing apparatus.

In a picture drawn on the picture screen of the monitor 8, as shown in FIG. 7A, a left hand of a man 101 is formed by the depression of the executing key 33 after the specific shape key 23f has been pushed; a right hand of the man 101 is formed by the depression of the executing key 33 after the specific shape key 23m has been pushed; a left leg of the man 101 is formed by the depression of the executing key 33 after the specific shape key 23g has been pushed; a right leg of the man is formed by the depression of the executing key 33 after the specific shape key 23n has been pushed; the head of the man 101 is formed by the depression of the executing key 33 after the specific key 23d has been pushed; clouds 105 are formed by the depression of the executing key 33 after the specific shape key 23h has been pushed; a circular light portion of the sun 104 is formed by the depression of the executing key 33 after the specific shape key 23a has been pushed; the eyes of a dragonfly 103 are formed by the depression of the executing key 33 after the specific shape key 23e has been pushed; and the wheels of an automobile 102 are formed by the depression of the executing key 33 after the specific shape key 23k has been pushed. The specific shape key unit 23 and the animation operation will now be described for the picture shown in FIG. 7A, so that specific shapes formed by specific shape keys other than those described above and animation operations thereof need not be described.

In the picture shown in FIG. 7A, the basic specific shapes determined by the depression of the executing key 33 after the specific shape key unit 23 has been pushed are stored beforehand in the ROM 3. More specifically, the cloud 105 is stored in a predetermined area of the ROM 3 in the form of a basic shape shown in FIG. 8A; the wheel of the automobile 102 is stored in a predetermined area of the ROM 3 in the form of a basic shape shown in FIG. 9A; the circular light portion of the sun 104 is stored in a predetermined area of the ROM 3 in the form of a basic shape shown in FIG. 10A; the head of the man 101 is stored in a predetermined area of the ROM 3 in the form of a basic shape shown in FIG. 11A; the right hand of the man 101 is stored in a predetermined area of the ROM 3 in the form of a basic shape shown in FIG. 12A; the left hand of the man 101 is stored in a predetermined area of the ROM 3 in the form of a basic shape shown in FIG. 13A; the left leg of the man 101 is stored in a predetermined area of the ROM 3 in the form of a basic shape shown in FIG. 14A; the right leg of the man 101 is stored in a predetermined area of the ROM 3 in the form of a basic shape shown in FIG. 15A; and the eye of the dragonfly 103 is stored in a predetermined area of the ROM 3 in the form of a basic shape shown in FIG. 16A. Further, in addition to the data of these basic specific shapes, there are prepared one of a plurality of specific shape data in which these basis specific shapes are changed. For example, if the hand stretches downwardly is the basic specific shape, then the hand stretched upwardly, the hand bent about the wrist and so on are specific shapes in which the basic specific shape of the man's hand is changed.

Figure 8A:
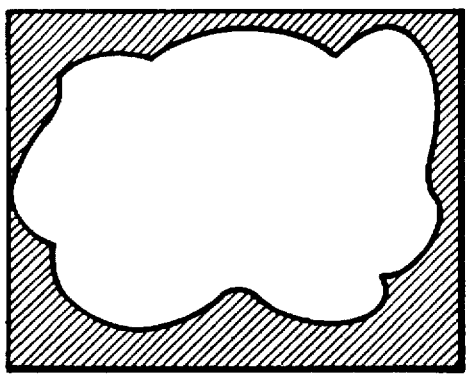
FIGS. 8A to 8C through to FIGS. 16A to 16C are schematic diagrams used to explain the graphic image processing apparatus.
Figure 9A:
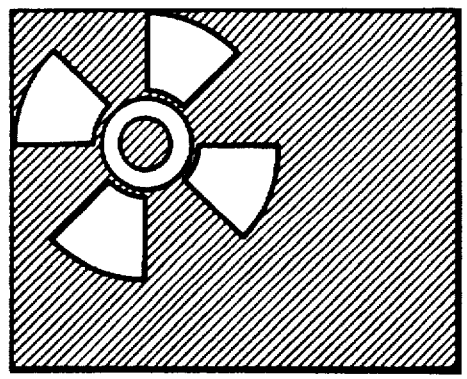
Figure 8B:
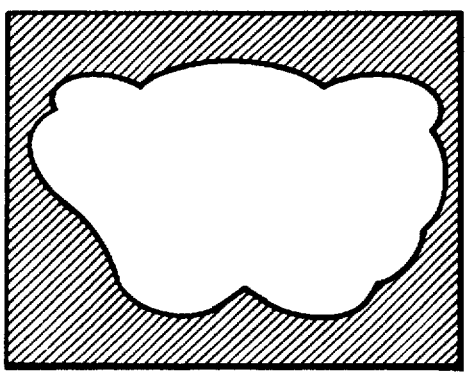
Figure 9B:
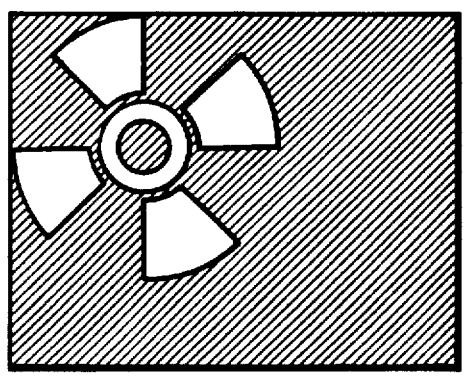
Figure 8C:
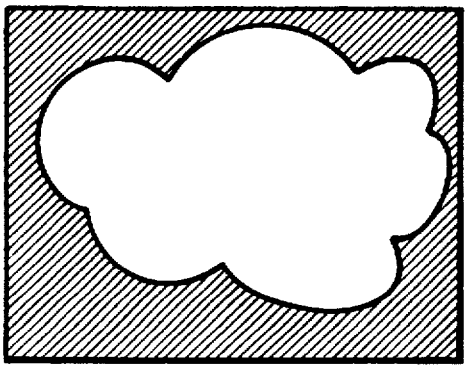
Figure 10A:
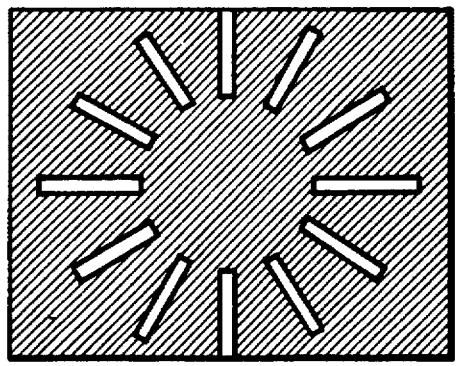
Figure 11A:
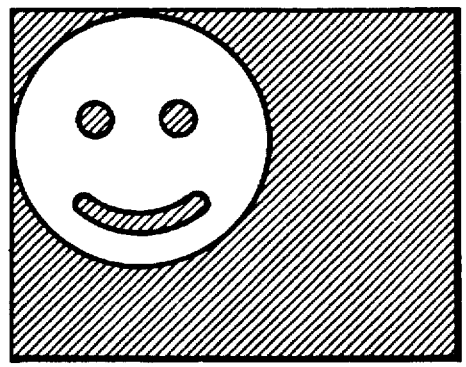
Figure 10B:
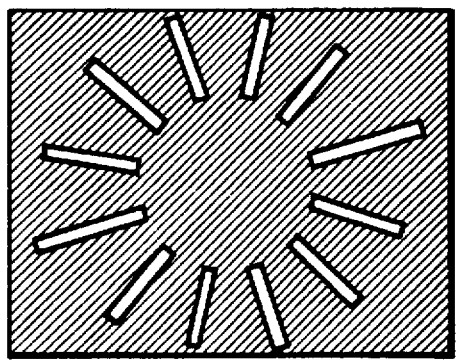
Figure 11B:
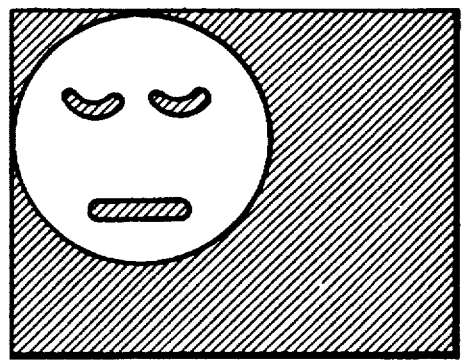
Figure 12A:
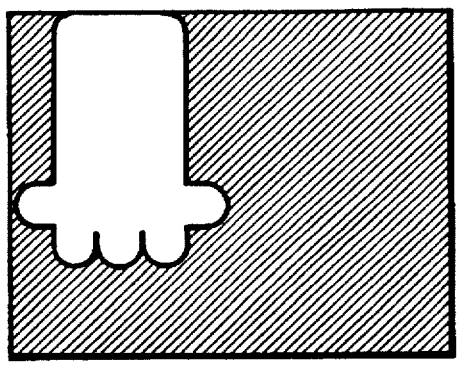
Figure 13A:
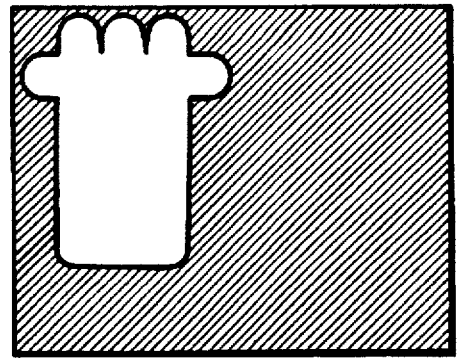
Figure 12B:
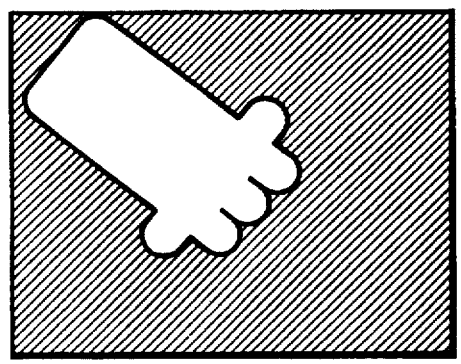
Figure 13B:
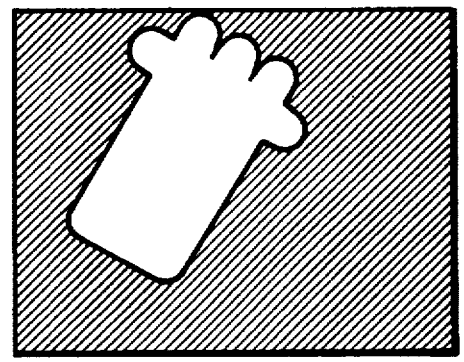
Figure 12C:
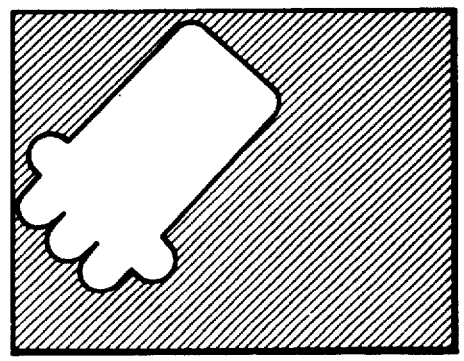
Figure 13C:
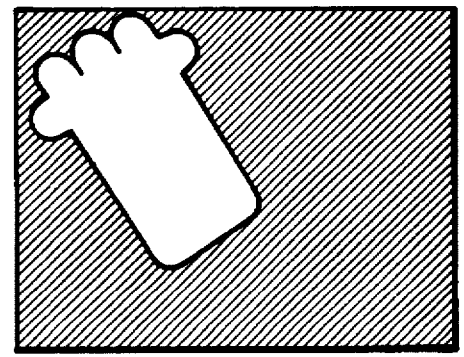
Figure 14A:
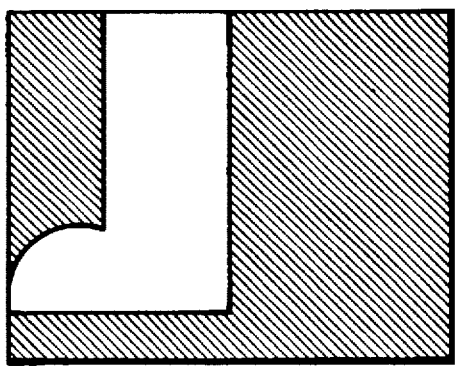
Figure 15A:
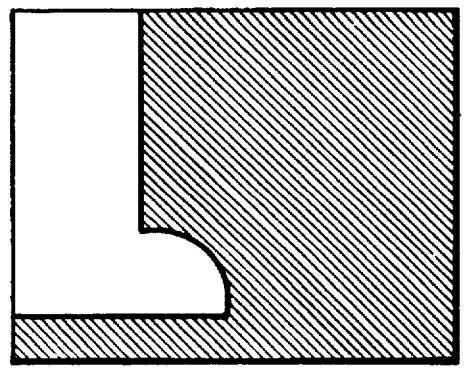
Figure 14B:
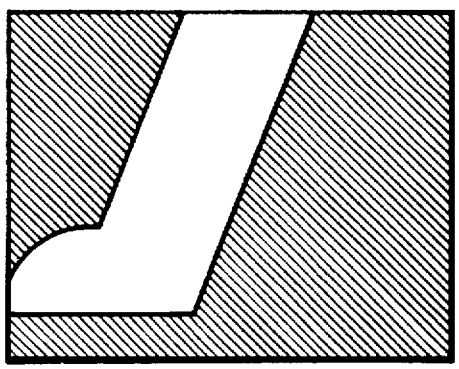
Figure 15B:
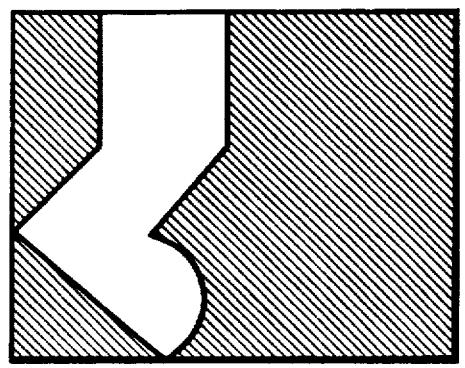
Figure 14C:
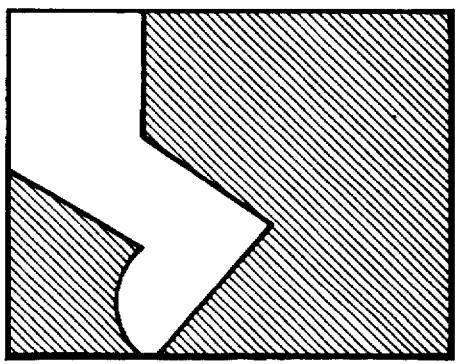
Figure 15C:
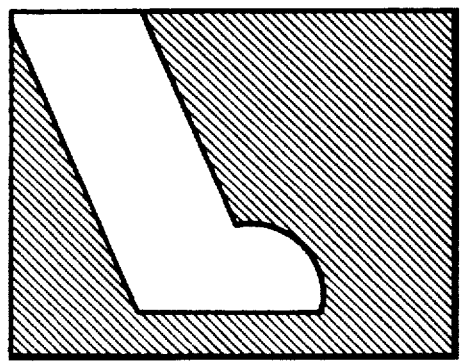
Figure 16A:
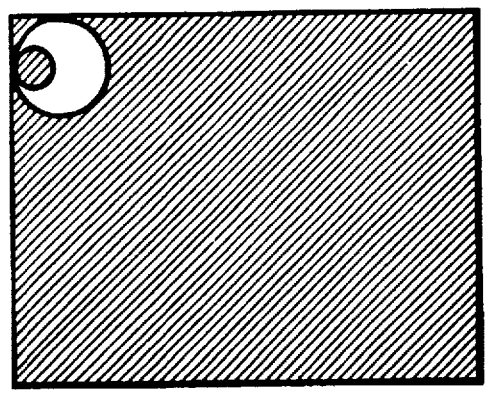
Figure 16B:
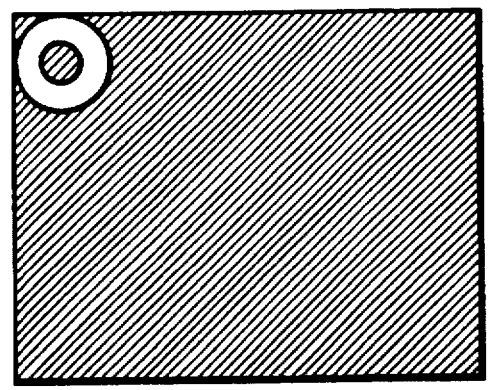
Figure 16C:
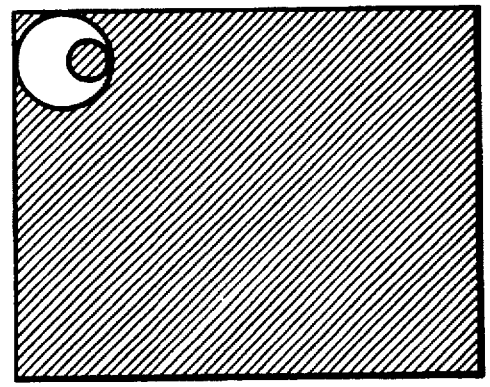

More specifically, in addition to the basic specific shape data of the cloud 105, data in which the basic specific shape is changed as shown in FIGS. 8B and 8C are stored in a predetermined area of the ROM 3; in addition to the basic specific shape data of the wheel of the automobile 102, data in which the basic specific shape is changed as shown in FIG. 9B is stored in a predetermined area of the ROM 3; in addition to the basic specific shape data of the circular light portion of the sun 104, data in which the basic specific shape is changed as shown in FIG. 10B is stored in a predetermined area of the ROM 3; in addition to the basic specific shape data of the head of the man 101, data in which the basic specific shape is changed as shown in FIG. 11B is stored in a predetermined area of the ROM 3; in addition to the basic specific shape data of the right hand of the man 101, data in which the basic specific shape is changed as shown in FIGS. 12B and 12C are stored in a predetermined area of the ROM 3; in addition to the basic specific shape data of the left hand of the man 101, data in which the basic specific shape is changed as shown in FIGS. 13B and 13C are stored in a predetermined area of the ROM 3; in addition to the basic specific shape data of the left leg of the man 101, data in which the basic specific shape is changed as shown in FIGS. 14B and 14C are stored in a predetermined area of the ROM 3; in addition to the basic specific shape data of the right leg of the man 101, data in which the basic specific shape is changed as shown in FIGS. 15B and 15C are stored in a predetermined area of the ROM 3; and, in addition to the basic specific shape data of the eye of the dragonfly 103, data in which the basic specific shape is changed as shown in FIGS. 16B and 16C are stored in a predetermined area of the ROM 3.

Other basic specific shape data are stored in predetermined areas of the ROM 3 together with one of a plurality of specific shape data in which the basic specific shapes are changed similarly.

Then, as shown in FIG. 5, number data corresponding, respectively, to the above basic specific shapes and specific shapes in which the basic specific shapes are changed are sequentially written in the memory areas of animation cell numbers in the memory area of the RAM 4. When the shape number data of the shape number stored in the memory area of the RAM 4 shown in FIG. 5 are data indicative of a specific shape (a basic specific shape), the animation cell number is read by the CPU 1 and the basic specific shape or the specific shape in which the basic specific shape is changed is read out from the ROM 3 in response to the thus read animation cell number, thereby being written in the RAM 6. Accordingly, since the animation cell numbers are sequentially rewritten, data of the specific associated with the animation cell numbers are sequentially written in the RAM 6 so that the specific shape is seen on the picture screen of the monitor 8 as if it were moved from a visual standpoint.

Figure 17:
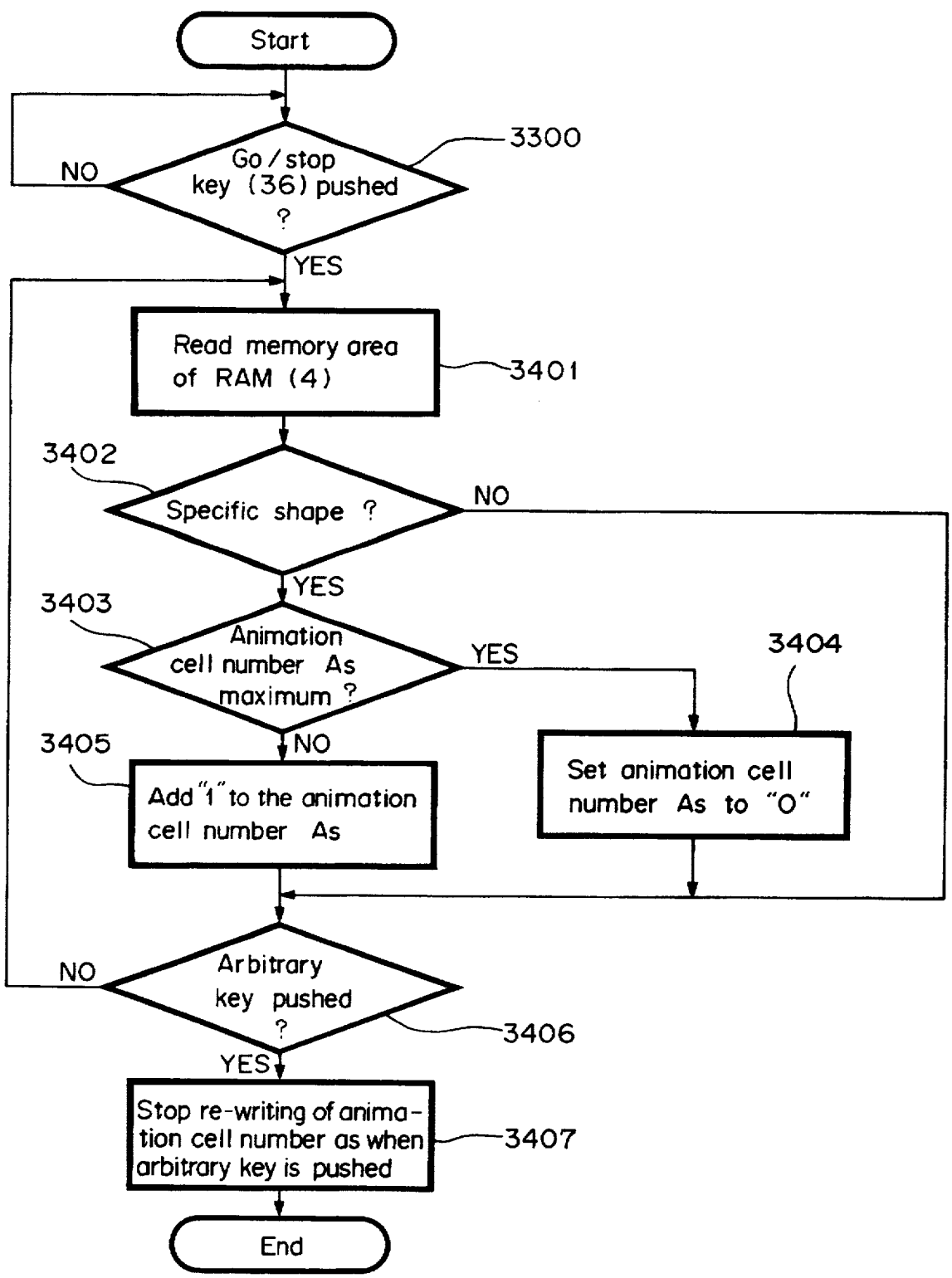
FIGS. 17 and 18 are respective flowcharts to which references will be made in explaining the operation of the graphic image processing apparatus.

This animation operation will be described with reference to a flowchart forming FIG. 17.

Following the Start of operation, it is determined in decision step 3300 (corresponding to decision step 3300 in FIG. 4) whether or not the GO/STOP key is being pushed. If a YES is output at decision step 3300, then the processing proceeds to step 3401, whereas if a NO is output, then the processing returns to step 3300 and step 3300 is repeated.

In step 3401, the memory area of the RAM 4 is read and then the processing proceeds to the next decision step 3402.

It is determined in decision step 3402 on the basis of the thus read shape number data of the shape number of the memory area of the RAM 4 whether or not the shape is the specific shape. If a YES is output at decision step 3402, then the processing proceeds to the next decision step 3403, whereas if a NO is output, then the processing proceeds to step 3406.

It is determined in decision step 3403 whether or not the animation cell number As is a maximum, or whether or not the animation cell number As is the sum of the number of a certain basic specific shape or the specific shapes in which a certain basic specific shape is changed. If a YES is output at decision step 3403, then the processing proceeds to step 3404, whereas if a NO is output, then the processing proceeds to step 3405.

In step 3404, the animation cell number As is set to zero. When the animation cell number As is 0, data of the basic specific shape indicated by the shape number data of, for example, the shape number area are read out from the ROM 3, and then the processing proceeds to the next decision step 3406.

In step 3405, "1" is added to the animation cell number As, and the processing proceeds to the next decision step 3406. Incidentally, when the animation cell number As is As+1, the data of a specific shape in which, for example, the basic specific shape designated by the shape number data of the shape number are changed are read out from the ROM 3.

It is determined in decision step 3406 whether or not an arbitrary key is pushed. If a YES is output at decision step 3406, then the processing proceeds to step 3407, whereas if a NO is output, then the processing returns to step 3401 again.

In step 3407, the re-writing of the animation cell number As is stopped when an arbitrary key is pushed, and then the processing is ended.

As is clear from the above explanation, since the animation cell numbers As stored in the memory area of the RAM 4 are sequentially re-written so long as an arbitrary key is not pushed in step 3406 after the GO/STOP key 36 is pushed, in the case of the picture in which the basic specific shape is utilized as shown in FIG. 8A, data of the basic specific shapes and the specific shapes in which the basic specific shapes are changed as shown in FIGS. 8 to 16 are sequentially written in the RAM 6 by the video processor 5, respectively.

Operation in which data of abstract and specific shapes read out from the ROM 3 are written in the RAM 6 will be described with reference to a flowchart of FIG. 18.

Figure 18:
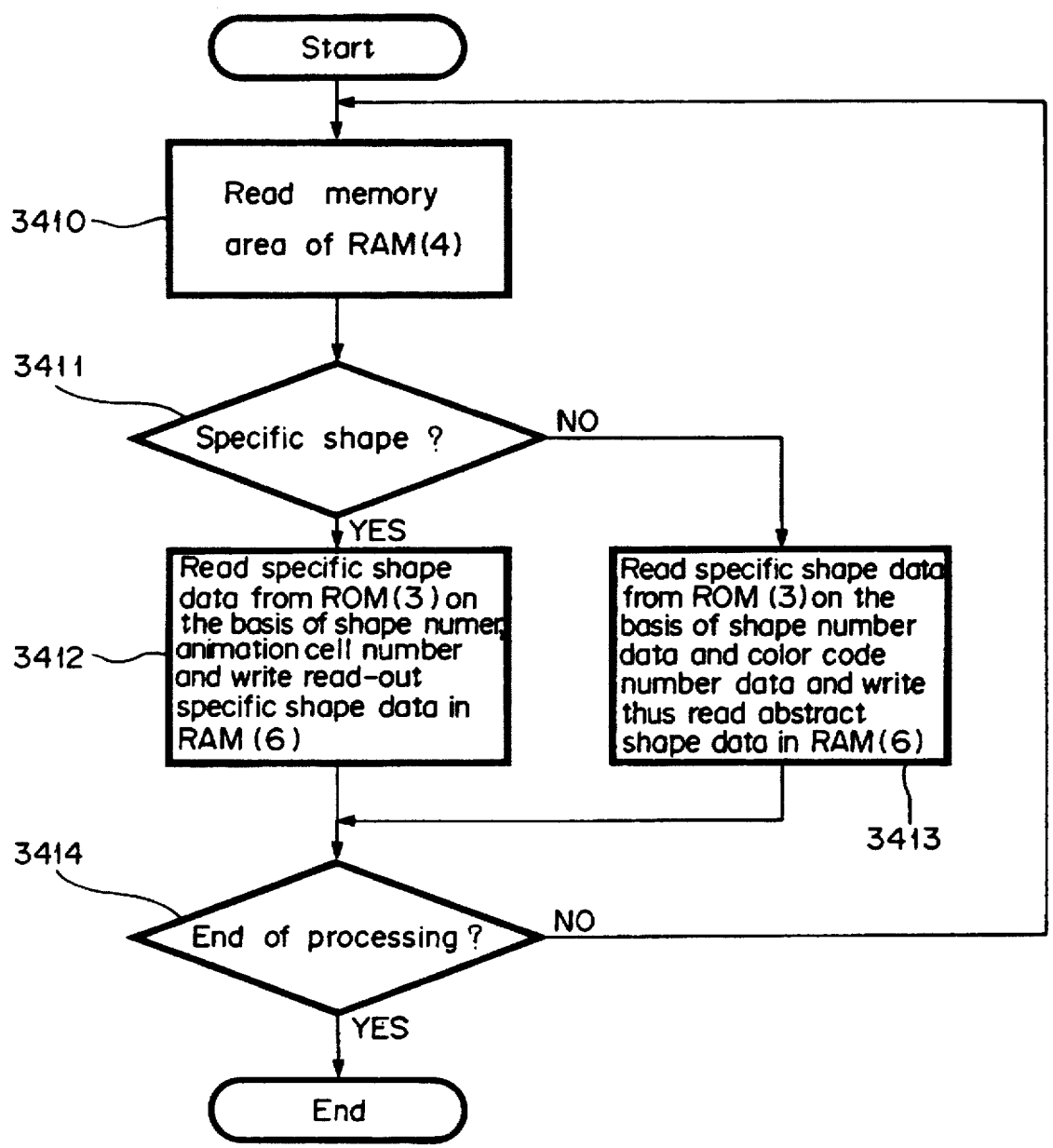

Referring to FIG. 18, following the Start of operation, in step 3410, the memory area (see FIG. 5) of the RAM 4 is read, and then the processing proceeds to the next decision step 3411.

It is determined in step 3411 on the basis of the shape number data of the shape number of the memory area read from the RAM 4 whether or not the shape is the specific shape. If a YES is output at decision step 3411, then the processing proceeds to step 3412, whereas if a NO is output, then the processing proceeds to step 3413.

On the basis of the shape number data of the shape number of the memory area of the RAM 4 and the animation cell number As, specific shape data (data of the basic specific shape or the specific shape in which the basic specific shape is changed) are read out from the ROM 3 and written in the RAM 6 of the video processor 5. Then, the processing proceeds to the next decision step 3414. At step 3413, on the basis of the shape number data of shape number of the memory area of the RAM 4 and the color code number data, abstract shape data are read out from the ROM 3 and the thus read abstract shape data are written in the RAM 6 of the video processor 5. Then, the processing proceeds to the next decision step 3414. It is determined in decision step 3414 whether or not the processing has ended. If a YES is output at decision step 3414, then the processing is ended, whereas if a NO is output, then the processing returns to step 3410.

Figure 7B:
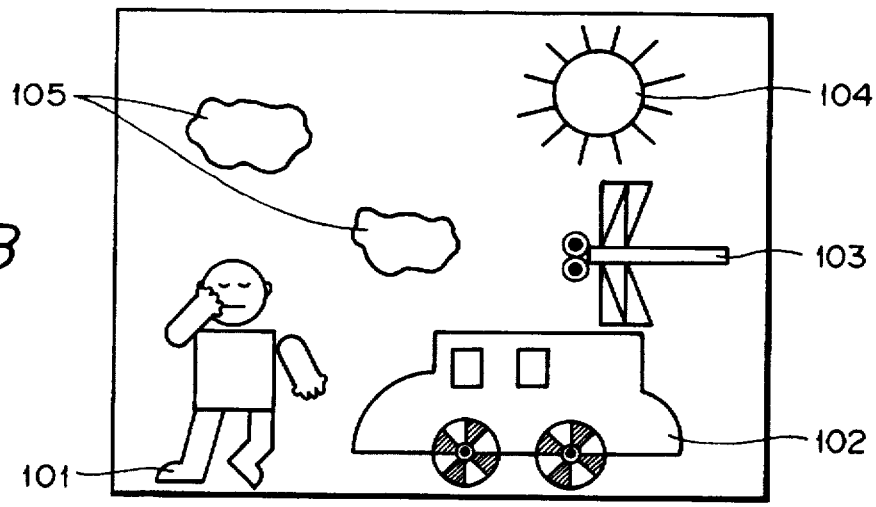

Accordingly, if the GO/STOP key is pushed after the picture shown in FIG. 7A has been made, then data of a specific shape in which the basic specific shape of the cloud 105 are changed as shown in FIG. 8B are written in the RAM 6 instead of data of the specific shape of the cloud 105 shown in FIG. 8A; data of specific shape in which the basic specific shape of the wheel of the automobile 102 are changed as shown in FIG. 9B are written in the RAM 6 instead of the data of the basic specific shape of the wheel of the automobile 102 shown in FIG. 9A; data of specific shape in which the basic specific shape of the circular light portion of the sun 104 are changed as shown in FIG. 10B are written in the RAM 6 instead of the data of the basic specific shape of the circular light portion of the sun 104 shown in FIG. 10A; data of specific shape in which the basic specific shape of the head of the man 101 are changed as shown in FIG. 11B are written in the RAM 6 instead of the data of the basic specific shape of the head of the man 101 shown in FIG. 11A; data of specific shape in which the basic specific shape of the right hand of the man 101 are changed as shown in FIG. 12B are written in the RAM 6 instead of the data of the basic specific shape of the right hand of the man 101 shown in FIG. 12A; data of specific shape in which the basic specific shape of the left hand of the man 101 are changed as shown in FIG. 13B are written in the RAM 6 instead of the data of the basic specific shape of the left hand of the man 101 shown in FIG. 13A; data of specific shape in which the basic specific shape of the left leg of the man 101 are changed as shown in FIG. 14B are written in the RAM 106 instead of the data of the basic specific shape of the left leg of the man 101 shown in FIG. 14A; data of specific shape in which the basic specific shape of the right leg of the man 101 are changed as shown in FIG. 15B are written in the RAM 6 instead of the data of the basic specific shape of the right leg of the man 101 shown in FIG. 15A; and data of specific shape in which the basic specific shape of the eye of the dragonfly 103 are changed as shown in FIG. 16B are written in the RAM 6 instead of the data of the basic specific shape of the eye of the dragonfly 103 shown in FIG. 16A. Then, image data formed of specific shapes and abstract shapes written in the RAM 6 are supplied through the encoder 7 to the monitor 8 so that the shapes of specific shapes shown in FIG. 7A are respectively changed as shown in FIG. 7B.

Figure 7C:
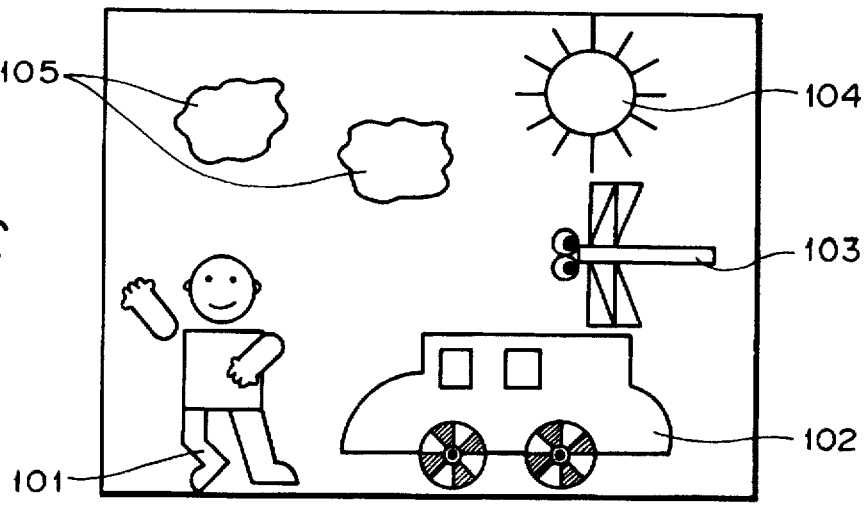

Further, data of the specific shape in which the specific shape of the cloud 105 is further changed as shown in FIG. 8C are written in the RAM 6 instead of the data of the specific shape of the cloud 105 shown in FIG. 8B; data of the basic specific shape of the wheel of the automobile 102 shown in FIG. 9A are written in the RAM 6 instead of the data of the specific shape of the wheel of the automobile 102 shown in FIG. 9B; data of the basic specific shape of the circular light portion of the sun 104 shown in FIG. 10A are written in the RAM 6 instead of the data of the specific shape of the circular light portion of the sun 104 shown in FIG. 10B; data of the basic specific shape of the head of the man 101 shown in FIG. 11A are written in the RAM 6 instead of the specific shape of the head of the man 101 shown in FIG. 11B; data of specific shape in which the specific shape of the right hand of the man 101 are further changed as shown in FIG. 12C are written in the RAM 6 instead of the data of the specific shape of the right hand of the man 101 shown in FIG. 12B; data of specific shape in which the specific shape of the left hand of the man 101 are further changed as shown in FIG. 13C are written in the RAM 6 instead of the data of the specific shape of the left hand of the man 101 shown in FIG. 13B; data of specific shape in which the specific shape of the left leg of the man 101 are further changed as shown in FIG. 14C are written in the RAM 6 instead of the data of the specific shape of the left leg of the man 101 shown in FIG. 14B; data of specific shape in which the specific shape of the right leg of the man 101 are further changed as shown in FIG. 15C are written in the RAM 6 instead of the data of the specific shape of the right leg of the man 101 shown in FIG. 15B; and data of specific shape in which the specific shape of the eye of the dragonfly 103 are further changed as shown in FIG. 16C are written in the RAM 6 instead of the data of the specific shape of the eye of the dragonfly 103 shown in FIG. 16B. Then, image data formed of specific shapes and abstract shapes written in the RAM 6 are supplied through the encoder 7 to the monitor 8 so that the shapes of the specific shapes shown in FIG. 7B are respectively changed as shown in FIG. 7C.

Similar operations are sequentially repeated until an arbitrary key is pushed, whereby a picture is displayed on the display screen of the monitor 8 like a real moving picture from a visual standpoint. Therefore, the user can make a picture in a vivid fashion, and the viewer can get satisfaction and pleasure in the pictures thus generated.

While basic specific shape data and data of specific shape in which the basic specific shape is changed are sequentially written in the RAM 6, if the basic specific data and the specific shape data are written in the RAM 6 randomly or written in the RAM 6 at a reduced time interval, then a picture may be moved on the display screen more quickly or more slowly.

Moreover, while the animation of a specific shape is described in the above embodiments, an abstract shape may be moved in its own way or a picture formed by the combination of abstract shapes may be moved automatically in its own way.

As described above, since the basic shape data and the character pattern data in which the basic shape is changed are sequentially read out from the memory means when the start button is pushed and the basic shape and the character pattern of shape in which the basic shape is changed are sequentially displayed on the display screen of the display apparatus, the user can make a picture in a vivid fashion and the viewer can get satisfaction and pleasure in the pictures from a visual effect standpoint.

Having described the preferred embodiments of the invention with reference to the accompanying drawings, it is to be understood that the invention is not limited to those precise embodiments and that various changes and modifications thereof could be effected by one skilled in the art without departing from the spirit or scope of the novel concepts of the invention as defined in the appended claims.

We claim:

1. A graphic image processing apparatus comprising:
a switch pad:
character pattern selecting means for selecting a predetermined character pattern, wherein the character pattern selecting means comprises a plurality of selecting keys mounted to a top surface of the switch pad, where each of the selecting keys of the character pattern selecting means has a mark thereon indicative of a different one of a set of character patterns;

color selecting means for selecting predetermined color data corresponding to said character pattern, wherein said color selecting means comprises a plurality of selecting keys mounted to the top surface of the switch pad, where each of the selecting keys of the color selecting means has a color thereon indicative of a different one of a set of colors;

display means for displaying said character pattern;

operating means for moving a cursor displayed on said display means;

first memory means for storing data corresponding to said character pattern and color data and reading out said data corresponding to said character pattern and color data in response to actuation of the selecting keys;

second memory means for storing display data indicative of data displayed on said display means;

control means for changing said cursor to said character pattern in response to actuation of at least one of the selecting keys of said character pattern selecting means; and executing means for storing said character pattern in said second memory means, wherein the executing means includes an executing key mounted to the top surface of the switch pad, and wherein in response to actuation of the executing key, the executing means stores said character pattern in said second memory means so as to display said character pattern in a desired position on the display means, wherein the desired position is determined by operation of said operating means.

2. Apparatus according to claim 1, wherein said operating means is a joystick for moving said cursor in a desired direction.

3. Apparatus according to claim 1 wherein said display means is a television monitor which is connected for displaying said character pattern.

4. Apparatus according to claim 3 further comprising converting means for converting digital data of said character pattern to a video signal which is transmitted to said display means.

5. A graphic image processing apparatus comprising:

a casing;

character pattern selecting keys mounted to a top surface of the casing, for selecting predetermined character patterns, where each of the character pattern selecting keys has a mark thereon indicative of a different one of the character patterns;

color selecting keys mounted to the top surface of the casing, for selecting predetermined color data corresponding to said character patterns, wherein each of the color selecting keys has a different color indicative of a selected value of the color data, and wherein actuation of any of said character pattern selecting keys generates analog data corresponding to a selected one of said character patterns and actuation of any of said color selecting keys generates analog data corresponding to a selected color;

an analog-to-digital converter for converting said analog data to digital signals;

a displaying apparatus;

operating means for moving a cursor displayed on the displaying apparatus, wherein the displaying apparatus is electrically connected to the operating means but physically separated from said operating means, and wherein the operating means is mounted to the top surface of the casing;

a read only memory for storing digital data corresponding to said predetermined character patterns and said predetermined color data and reading out said digital data in response to said digital signals;

a video processor for converting digital data read out from the read only memory to video data, and supplying the video data to the displaying apparatus for display on said displaying apparatus;

a random access memory for storing said video data;

control means for replacing said cursor with digital data corresponding to said selected one of the character patterns, after said digital data are read out from said read only memory;

a second random access memory; and executing means for storing video data corresponding to said selected one of the character patterns in said second random access memory, wherein the executing means includes an executing key mounted to the top surface of the casing, and wherein in response to actuation of the executing key, the executing means stores said video data in said second random access memory to enable display of the selected one of the character patterns in a desired position on the displaying means, wherein the desired position is determined by operation of said operating means.

6. A graphic image processing apparatus comprising:

a switch pad;

character pattern selecting means for selecting a predetermined basic character pattern, wherein the character pattern selecting means includes a plurality of pattern selecting keys mounted to a top surface of the switch pad, each of the pattern selecting keys having a mark thereon indicative of a different one of a set of character patterns, and means for generating a basic pattern selection signal in response to actuation one of the pattern selecting keys;

display means for displaying said basic character pattern;

operating means for moving a cursor on said display means;

first memory means for storing data corresponding to a basic character and data corresponding to various characters corresponding to said basic character;

second memory means for storing display data which are displayed on said display means;

control means for changing said cursor to said basic character pattern in response to generation of the basic pattern selection signal;

executing means for fixing said basic character pattern in said second memory means, wherein the executing means includes an executing key mounted to the top surface of the switch pad, and wherein in response to actuation of the executing key, the executing means stores said basic character pattern in said second memory means to enable display of the basic character pattern in a desired position on the display means, wherein the desired position is determined by operation of said operating means;

a starting key mounted to the top surface of the switch pad, and means for generating a start signal in response to actuation of the starting key; and memory control means for sequentially reading out data corresponding to said basic character and said various characters from said first memory means in response to generation of the start signal, to cause animated sequential display of the basic character and the various characters on the display means.

* * * * *